United States Patent Office 3,645,942
Patented Feb. 29, 1972

3,645,942
FOUNDRY PROCESS USING A PROPOXYLATED TOLUENE DIAMINE AS AN EXTENDER WITH A CASTOR OIL-AROMATIC DIISOCYANATE PREPOLYMER
Lloyd H. Brown, Crystal Lake, and Laurence J. Klemm, Elgin, Ill., assignors to The Quaker Oats Company, Chicago, Ill.
No Drawing. Filed Apr. 29, 1970, Ser. No. 33,102
Int. Cl. B22c 1/24; C08g 22/04
U.S. Cl. 260—18 TN           4 Claims

ABSTRACT OF THE DISCLOSURE

A foundry process is disclosed including the use of novel core binders which are prepared by first forming a prepolymer from an aromatic polyisocyanate and non-drying castor oil; then mixing the prepolymer with a high molecular weight hydroxy containing material and an accelerator. The high molecular weight hydroxy containing material can be either an aliphatic polyether polyol or an aromatic polyether polyol. The accelerator can be either a metal naphthenate, organotin compound, or tertiary amine. The prepolymer may also include tung oil.

BACKGROUND OF THE INVENTION

Field of the invention

This invention relates to foundry core binders and foundry processes. More particularly this invention relates to urethane core binders and a process for their use in the foundry industry.

Description of the prior art

In the foundry art cores for use in making metal castings are normally prepared from mixtures of an aggregate material, e.g. sand, which has been combined with a binding amount of polymerizable or curable binder. After the sand and binder have been mixed, the resulting sand mix is rammed, blown, or otherwise thrust into a pattern thereby assuming the shape defined by the adjacent surfaces of the pattern. This art has grown to include the use of the so-called "no-bake binders" which are compositions capable of curing or polymerizing under ambient room conditions to form excellent cores.

Among the no-bake binders that have been advanced thus far, are those that include oil modified alkyd isocyanate binders and those that include various combinations of isocyanates with drying oils. These particular binders, however, have several deficiencies. Among these deficiencies are that the binders are somewhat difficult to handle and that they do not have acceptable stripping strength or breakdown properties. By use of the term "stripping strength" is meant the ability of the binder to give the green core the properties which allow it to be stripped from the mold or pattern and then completely cured while under support to allow the mold or pattern to be subsequently used while the core is being cured. By use of the term "good breakdown properties" it is meant the ability of the material to be vibrated or otherwise disturbed after the metal is poured to thereby render it reasonably free flowing.

The novel urethane core binders and the foundry process for using them as disclosed herein overcome the deficiencies of the prior art.

SUMMARY OF THE INVENTION

It is an object of this invention to provide a method for producing a urethane core binder which will impart good stripping properties to a green core.

It is another object of this invention to provide a method for producing novel urethane core binders which impart to the cores in which they are used good breakdown properties.

It is still another object of this invention to provide a foundry process for producing novel foundry cores.

The objects of this invention are accomplished by a process for producing urethane core binders, said process comprising:

(A) preparing a first package by forming a prepolymer, said forming of a prepolymer comprising admixing an aromatic polyisocyanate with non-drying castor oil, said aromatic polyisocyanate and said non-drying castor oil being admixed in amounts such that the NCO to OH ratio is from 1.5 to 8.0;

(B) preparing a second package comprising an admixture of high molecular weight hydroxy containing material and an accelerator, said high molecular weight hydroxy containing material comprising a member selected from the group comprising aliphatic polyether polyols and aromatic polyether polyols, said accelerator comprising a member selected from the group comprising metal naphthenates, organotin compounds and tertiary amines; and (C) admixing said first package and said second package in an amount sufficient to maintain the NCO to OH ratio above 1.0 and in an amount wherein said accelerator is less than 50 percent by weight of said prepolymer.

The objects of this invention are further accomplished by the method as disclosed above wherein tung oil is also admixed in the prepolymer composition. In such a case the process for producing the urethane core binders comprises:

(A) preparing a first package by forming a prepolymer, said forming of a prepolymer comprising admixing an aromatic polyisocyanate with non-drying castor oil and tung oil, said aromatic polyisocyanate, said non-drying castor oil, and said tung oil being admixed in amounts such that the NCO to OH ratio is from 1.5 to 8.0;

(B) preparing a second package comprising an admixture of high molecular weight hydroxy containing material and an accelerator, said high molecular weight hydroxy containing material comprising a member selected from the group comprising aliphatic polyether polyols and aromatic polyether polyols, said accelerator comprising a member selected from the group comprising metal naphthenates, organotin compounds and tertiary amines; and (C) admixing said first package and said second package in an amount sufficient to maintain the NCO to OH ratio above 1.0 and in an amount wherein said accelerator is less than 50 percent by weight of said prepolymer.

The objects of this invention are still further accomplished by a foundry process which utilizes the above-described binder. This foundry process comprises:

(A) mixing sand with a binding amount of up to 10 percent by weight based on the weight of the sand of a no-bake binder to thereby form a foundry mix, said no-bake binder comprising an aromatic polyisocyanate, non-drying castor oil, a high molecular weight hydroxy containing material and an accelerator, and said no-bake binder produced by
  (a) preparing a first package by forming a prepolymer, said forming of a prepolymer comprising admixing an aromatic polyisocyanate with non-drying castor oil, said aromatic polyisocyanate and said non-drying castor oil being admixed in amounts such that the NCO to OH ratio is from 1.5 to 8.0;
  (b) preparing a second package comprising an admixture of high molecular weight hydroxy containing material and an accelerator, said high molecular weight hydroxy containing material comprising aliphatic polyether polyols and aromatic polyether polyols, said accelerator comprising a member selected from the group comprising metal naphthenates, organotin compounds and tertiary amines; and
  (c) admixing said first package and said second package in an amount sufficient to maintain the NCO to OH ratio above 1.0 and in an amount wherein said accelerator is less than 50 percent by weight of said prepolymer;
(B) shaping the mixed sand and binder;
(C) curing the shaped sand to thereby form a sand core.

The objects of this invention are still further accomplished by a foundry process such as is disclosed above and wherein the prepolymer also includes tung oil. In such a case the foundry process comprises:

(A) mixing sand with a binding amount of up to 10 percent by weight based on the weight of the sand of a no-bake binder comprising an aromatic polyisocyanate, non-drying castor oil, tung oil, a high molecular weight hydroxy containing material, and an accelerator, and said no-bake binder produced by
  (a) forming a prepolymer, said forming of a prepolymer comprising admixing an aromatic polyisocyanate with non-drying castor oil and tung oil, said aromatic polyisocyanate, said non-drying castor oil, and said tung oil being admixed in amounts such that the NCO to OH ratio is from 1.5 to 8.0;
  (b) admixing the prepolymer with a high molecular weight hydroxy containing material and an accelerator, said high molecular weight hydroxy containing material comprising a member selected from the group comprising aliphatic polyether polyols and aromatic polyether polyols, said accelerator comprising a member selected from the group comprising metal naphthenates, organotin compounds, and tertiary amines, said high molecular weight hydroxy containing material being admixed with said prepolymer in an amount sufficient to maintain the NCO to OH ratio above 1.0, and said accelerator being admixed in an amount less than 50 percent by weight of the prepolymer;
(B) shaping the mixed sand and binder; and
(C) curing the shaped sand to thereby form a sand core.

The first step in producing the urethane core binder of this invention includes forming a prepolymer. The forming of the prepolymer comprises admixing an aromatic polyisocyanate with non-drying castor oil in such an amount that the NCO to OH ratio is from 1.5 to 8.0.

By use herein of the term "aromatic polyisocyanate" we intend to mean generally any of the aromatic polyisocyanates that are commonly used in the foundry industry to promote a reaction or curing to form a urethane core binder. Among the more commonly accepted aromatic polyisocyanates which may be used in this invention are the following:

p-phenylene diisocyanate
m-phenylene diisocyanate
2,4-toluene diisocyanate
2,6-toluene diisocyanate
p-isocyanto benzyl isocyanate
2-nitrodiphenyl-4,4' diisocyanate
1,5-naphthalene diisocyanate
xylylene diisocyanate and the methyl derivative thereof
1-ethoxy-2,4-benzene diisocyanate
dipheinyl methane diisocyanate and dimethyl derivative
methylene bis(4-phenylisocyanate)
4,4'-diphenylpropane diisocyanate
xenylene-4,4'-diisocyanate.

Of particular importance to this invention and preferred as the aromatic polyisocyanates are the toluene diisocyanates including both 2,4-toluene diisocyanate and 2,6-toluene diisocyanate.

The prepolymer of this invention includes the use of non-drying castor oil. It is critical in this invention that the castor oil be non-drying. The prior art includes preparation of core binders which utilize drying castor oil with polyisocyanates. It is to be emphasized that these drying castor oils will not be operable in the present invention. By use of the term "non-drying" with reference to the castor oil, it is intended to mean castor oil which is not capable of reacting with oxygen in the air at room temperatures (alone or with the aid of a catalyst) in the presence of sand to thereby harden the sand into a rigid mass. This does not include castor oil which has been dehydrated to drive off the OH and thus increase the carbon-to-carbon double bonds.

The prepolymer of this invention may also optionally include the use of tung oil. The tung oil serves many purposes. Among these purposes are that it is a diluent and that it can serve to air dry and cross-link the prepolymer. By use herein of the term "tung oil" we intend to mean the commonly accepted definition which is a mixture of the triglycerides of eleostearic acid. As used herein, the tung oil is a natural drying oil as opposed to the castor oil having the required non-drying feature.

The prepolymer of this invention is prepared by admixing the aromatic polyisocyanate with non-drying castor oil in amounts such that the NCO to OH ratio is from 1.5 to 8.0. If the NCO to OH ratio drops substantially below 1.5 in the prepolymer, the prepolymer becomes very sluggish and very difficult to work with. If the NCO to OH ratio of the prepolymer increases substantially above 8.0, the free isocyanate presents a very serious toxicity problem to personnel working with the material. We prefer that the NCO to OH ratio in the prepolymer be maintained between 2 and 3 since these values give very excellent cores without bordering on the above-mentioned problems.

When tung oil is used in the prepolymer composition, it is still necessary that the NCO to OH ratio be maintained between 1.5 and 8.0 and preferably between 2 and 3. While the tung oil does enter into the drying process, it is not used as the source of the hydroxyl units which combine with the isocyanate. In other words, it is not acceptable to substitute tung oil for a major portion of the non-drying castor oil.

While it is not absolutely necessary, it is generally preferred in the preparation of the prepolymer to mix the aromatic polyisocyanate and the non-drying castor oil (plus the tung oil if it is used) and heat the mixture to 90° C. for 2 or 3 minutes in order to insure an adequate interaction or combination of the aromatic polyisocyanate with the hydroxy containing material.

After the prepolymer has been prepared, it is then admixed with a high molecular weight hydroxy containing material and an accelerator with the high molecular weight hydroxy containing material being admixed with the prepolymer in an amount sufficient to maintain the NCO to OH ratio above 1.0 and with the accelerator being admixed in an amount less than 50 percent by weight of the prepolymer.

The high molecular weight hydroxy containing material which may be admixed with the prepolymer includes the aliphatic polyether polyols and the aromatic polyether polyols. Of particular importance as high molecular weight hydroxy containing materials are the reaction products of propylene oxide and/or ethylene oxide with polyols or amines having a functionality of 2 or greater. In the case of a polyol, a functionality of 2 would indicate 2 OH's per molecule. In the case of an amine, a functionality of 2 would indicate 2 active hydrogens on the amine group. Typical amines which may be reacted with propylene oxide and/or ethylene oxide in this invention are toluene diamine and ethylene diamine. Typical of the polyols which may be reacted with the propylene oxide and/or ethylene oxide to prepare a polyether polyol acceptable as a high molecular weight hydroxy containing material in this invention are the sugar such as sucrose, glucose, and sorbitol and the common diols and triols. Examples of aliphatic polyether polyols which may be used in this invention are a polypropylene glycol sold under the trademark Pluracol P2010 by Wyandotte Chemical Co., Wyandotte, Mich. Another acceptable polyol is a propoxylated sucrose sold as RS–350 by Dow Chemical Co., Midland, Mich. Included in the aromatic polyether pyolyols which may be used in this invention is an aromatic polyether polyol sold as BE–320 by Union Carbide Corp., New York, N.Y.

The preferred high molecular weight hydroxy containing material which may be used in this invention is sold by Wyandotte Chemical Co. with the identification P434 and said to be an aromatic polyether polyol. It is generally believed that the formula of this hydroxy containing material is as follows and is one which has been found to be an acceptable material for use in this invention:

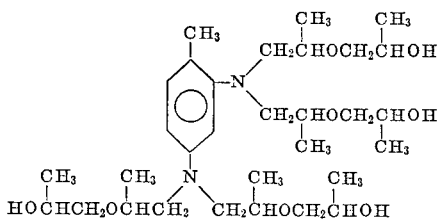

The method for producing urethane core binders of this invention includes the use of an accelerator. The accelerator is used to accelerate the action of the polyisocyanate with the polyol. While a large number of accelerators are operable within the scope of this invention, it is generally desirable to choose an accelerator which will give the desired rate of reaction as well as one which will provide the desired physical properties in the urethane. The accelerator that is used in this invention may include either a metal naphthenate, organotin compound or tertiary amines. By use herein of the term "metal naphthenate" we intend to mean any of the well known and commonly used metal naphthenates. The more common of the metal naphthenates includes the following:

cobalt naphthenate
lead naphthenate
zinc naphthenate
calcium naphthenate

When a metal naphthenate is used as the accelerator in this invention, it is preferred to use cobalt naphthenate.

By use herein of the term "organotin compound" we intend to mean any of the commonly known organotin compounds which may be used to accelerate the polyurethane reaction. Among the more common organotin compounds are the following:

stannous octoate
dibutyl tin dilaurate
dibutyl tin dioctoate
stannous oleate
di-n-octyl-tin monobutyl maleate
di-n-octyl-tin bis-(2-ethyl hexanoate)
di-n-octyl-tin dibutyl thioacetate
tetraalkyl stannates (alkyl containing 2 to 8 carbon atoms).

The preferred organotin compound and the preferred accelerator for this invention is dibutyl tin dilaurate.

The accelerator of this invention may also be a tertiary amine. Ammonia, primary amines, and secondary amines exhibit some of the desired activity when used as an accelerator in this invention but the resulting cores are of an inferior quality to such an extent that those amines are not to be deemed as operable herein. Among the more common tertiary amines that may be used in this invention are the following:

triethylamine
triethylenediamine
trimethylamine
benzyl dimethylamine
N-ethylethyleneamine
pyridine
N,N-dimethylcyclohexylamine The preferred tertiary amine that may be used as an accelerator in this invention is triethylamine.

The high molecular weight hydroxy containing material is admixed with the prepolymer in an amount sufficient to maintain the NCO to OH ratio above 1.0. Since the NCO to OH ratio of the prepolymer is from 1.5 to 8.0 (by definition of the prepolymer). It is readily ascertainable what range of high molecular weight hydroxy containing material can be added to any given prepolymer to maintain the NCO to OH ratio above 1.0. The preferred NCO to OH ratio is very near one, i.e. about 1.05 to about 1.1, although it may be larger numbers. The amount of high molecular weight hydroxy containing material that may be added is readily calculated to give this result. Generally, an NCO to OH ratio in the final product above 2.0 would be undesirable.

The accelerator used in this invention must be admixed with the prepolymer in an amount less than 50 percent by weight of the prepolymer. It is to be understood that those well-skilled in the art will choose the amount of accelerator to give certain conditions and certain cure times by considering the particular accelerator and the ability of the accelerator to promote the desired result.

While a very good binder composition can be prepared with castor oil as the only hydroxy material in the prepolymer, such a binder composition will generally have a very high viscosity, some times as high as 100,000 cps. If the viscosity is desired to be at a lower range, it is desirable to make use of tung oil in the prepolymer in which case the viscosity at room temperature can be decreased to the range of from about 2000 to 3000 cps. It is to be appreciated that a balance needs to be made between the viscosity which creates handling problems and the NCO to OH ratio which causes toxicity problems due to free isocyanate in the mix.

The foundry process of this invention includes mixing sand with a binding amount of up to 10 percent by weight based on the weight of the sand of one of the aforementioned binder compositions; then shaping the mixed sand and binder and then curing the shaped sand to thereby form a sand core. The amount of binder that is desired may be adjusted within the stated range to achieve the desired degree of binding and to achieve the optimum stripping and breaking characteristics. The foundry process disclosed herein can make use of binders prepared by either a prepolymer having castor oil therein or a prepolymer having a combination of castor oil and tung oil therein.

DESCRIPTION OF THE PREFERRED EMBODIMENTS

The following examples are used to illustrate but not limit this invention. Example 1 may be taken to illustrate a preferred embodiment of this invention. As used herein and unless otherwise indicated, the values for tensile strength and scratch hardness are determined by procedures described in the Foundry Sand Handbook, 7th edition, copyright 1963, by the American Foundry Society, Inc., Des Plaines, Ill.

EXAMPLE 1

A prepolymer was prepared by admixing 810 grams of a mixture of 80 percent by weight 2,4-toluene diisocyanates and 20 percent by weight 2,6-toluene diisocyanate with 1590 grams of castor oil and heating the mixture to 90° C. for 3 minutes to obtain a good combination of toluene disocyanate with the castor oil. The theoretical NCO to OH ratio of this prepolymer is equal to 2.0. The theoretical percent of free NCO in the prepolymer was 8.13 percent as opposed to measured free NCO of 8.17 percent. The viscosity of the prepolymer at 27° C. was found to be greater than 100,000 cps.

Next, a mixture was prepared by admixing 3000 grams of Wedron silica sand, 8.1 grams of toluene diamine polyether polyol (P434, Wyandotte Chemical Co., Wyandotte, Mich.), 1.8 grams of toluene as a diluent, 0.34 gram of dibutyl tin dilaurate and 0.20 gram trimethylamine. This mixture was mixed for 3 minutes and then 35.8 grams of the prepolymer and 14.3 grams of toluene were mixed with the mixture for 2 minutes. This mixture was then molded into various molds and allowed to cure overnight. For an overnight cure at a relative humidity of 47 to 48 percent, the cores produced from this material were found to have a tensile strength of 230 p.s.i. and a Dietert scratch hardness of from 97 to 100. On cores being cured overnight at a relative humidity of from 93 to 94 percent, the tensile strength was found to be 186 p.s.i. and the scratch hardness was found to be from 97 to 100.

Although the tensile strength for these samples is not shown to be substantially above those of some of the better oil modified alkyd isocyanate binders, the shake-out and break-up properties of these cores were found to be far superior to the oil modified alkyd isocyanate binders.

EXAMPLE 2

A prepolymer was prepared by admixing 335 grams of a mixture of 80 percent by weight 2,4-toluene diisocyanate and 20 percent by weight 2,6-toluene diisocyanate and 435 grams castor oil and heating the mixture to 90° C. for 3 minutes. This mixture was then cooled to room temperature and 180 grams of tung oil was admixed thereto. The prepolymer had a theoretical free NCO of 11.45 percent and a measured free NCO of 11.13 percent. The viscosity of the prepolymer at 27° C. was found to be 2850 cps. Next, 3000 grams of Wedron silica sand were mixed with 13.9 grams of a toluene diamine polyether polyol (P434 as hereinbefore described), 2.2 grams of an aromatic naphtha solvent as a diluent (SUPER HIGH FLASH, American Mineral Spirits Co., division of Union Oil of California), and 3.73 grams of triethylenediamine. This mixture was mixed for 3 minutes and then 40 grams of the prepolymer and an additional 4 grams of the aromatic naphtha solvent were added thereto and mixed therein for 2 minutes. The mixture was molded into cores and allowed to cure overnight. After overnight curing at 27 percent relative humidity, cores prepared from this material were found to have a tensile strength of 513 p.s.i. and a scratch hardness of from 99 to 100. Cores cured overnight at 93 percent relative humidity were found to have a tensile strength of 456 p.s.i. and a scratch hardness of from 99 to 100. Cores cured overnight at extremely low relative humidity, i.e. about 0 percent relative humidity, were found to have a tensile strength of 295 p.s.i. and a scratch hardness of 99 to 100.

The cores prepared in this example were found to have superior shake-out properties and superior break-down properties when compared to any of those prepared by prior art methods.

EXAMPLE 3

The prepolymer of Example 1 was prepared with the exception that the amount of the mixture 2,4-toluene diisocyanate and 2,6-toluene diisocyanate was increased to give a theoretical NCO to OH ratio of 3. Next, 3000 grams of Wedron silica sand was mixed for 3 minutes with 15.4 grams of the toluene diamine polyether polyol described in previous examples, 3.1 grams of the above-described aromatic naphtha solvent, and 0.73 gram dibutyl tin dilaurate. After mixing, 36.2 grams of the prepolymer and an additional 5.4 grams of the aromatic naphtha solvent were admixed for 2 minutes with the above mixture. The mixture was then immediately molded into cores and cured overnight. The prepolymer of this example was found to have an NCO to OH ratio of 3. After overnight curing at from 32 to 34 percent relative humidity, a core prepared from this mixture was found to have a tensile strength of 475 p.s.i. and a scratch hardness of 99 to 100. After overnight curing at a relative humidity of 93 percent, a core prepared from this mixture was found to have a tensile strength of 346 p.s.i. and a scratch hardness of from 99 to 100. After overnight curing under very dry conditions, i.e. about 0 percent relative humidity, a core prepared from this mixture was found to have a tensile strength of 201 p.s.i., and a scratch hardness of 99 to 100.

Cores produced by this invention have excellent breakdown and shakeout properties. These properties are superior to anything illustrated by the art involving oil modified alkyd isocyanate binders.

Having fully described this new and unique invention, we claim:

1. A foundry process comprising:
   (A) mixing sand with a binding amount of up to 10 percent by weight based on the weight of the sand of a no-bake binder to thereby form a foundry mix said no-bake binder produced by
     (a) preparing a first package by forming a prepolymer, said forming of a prepolymer comprising admixing an aromatic polyisocyanate with non-drying castor oil, said aromatic polyisocyanate and said non-drying castor oil being admixed in amounts such that the NCO to OH ratio is from 1.5:1 to 8.0:1;
     (b) preparing a second package comprising an admixture of 2,4-bis[N,N-di-2-(2-hydroxypropoxy)propyl]amino-1-methyl benzene and an accelerator selected from the group consisting of metal naphthenates, organotin compounds and tertiary amines;
     (c) admixing said first package and said second package in an amount sufficient to maintain the NCO to OH ratio above 1.0:1 and in an amount wherein said accelerator is less than 50 percent by weight of said prepolymer;
   (B) shaping the mixed sand and binder;
   (C) curing the shaped sand to thereby form a sand core.

2. A process as in claim 1 wherein the aromatic polyisocyanate is toluene diisocyanate, the NCO to OH ratio is from 2.0:1 to 3.0:1, and the accelerator is dibutyl tin dilaurate.

3. A foundry process comprising:
   (A) mixing sand with a binding amount of up to 10 percent by weight based on the weight of the sand of a no-bake binder to thereby form a foundry mix said no-bake binder produced by
 (a) forming a prepolymer, said forming of a prepolymer comprising admixing an aromatic polyisocyanate with non-drying castor oil and tung oil, said aromatic polyisocyanate, said non-drying castor oil, and said tung oil being admixed in amounts such that the NCO to OH ratio is from 1.5:1 to 8.0:1;
 (b) admixing the prepolymer with 2,4-bis[N,N-di - 2 - (2 - hydroxypropoxy)propyl]amino-1-methylbenzene and an accelerator selected from the group consisting of naphthenates, organotin compounds, and tertiary amines, said 2,4-bis-[N,N - di - 2-(2-hydroxypropoxy)propyl]amino-1-methyl benzene being admixed with said prepolymer in an amount sufficient to maintain the NCO to OH ratio above 1.0:1.0, and said accelerator being admixed in an amount less than 50 percent by weight of the prepolymer;
(B) shaping the mixed sand and binder; and
(C) curing the shaped sand to thereby form a sand core.

4. A process as in claim 3 wherein the aromatic polyisocyanate is toluene diisocyanate, the NCO to OH ratio is from 2.0:1 to 3.0:1, and the accelerator is dibutyl tin dilaurate.

References Cited
UNITED STATES PATENTS

| 3,345,311 | 10/1967 | Ehrlich et al. | 260—18 |
| 3,255,500 | 6/1966 | Engel et al. | 260—18 |
| 3,429,848 | 2/1969 | Robins | 260—38 |
| 2,787,601 | 4/1957 | Detrick et al. | 260—18 |
| 2,772,245 | 11/1956 | Simon et al. | 260—18 |
| 3,426,831 | 2/1969 | Robins et al. | 260—18 |
| 3,385,345 | 5/1969 | Miraldi | 106—38.7 |

FOREIGN PATENTS

| 738,518 | 7/1966 | Canada | 260—77.5 |

MAURICE J. WELSH, JR., Primary Examiner

E. C. RZUCIDLO, Assistant Examiner

U.S. Cl. X.R.

106—38.7; 164—43; 260—37 N

PO-1050
(5/69)

UNITED STATES PATENT OFFICE
CERTIFICATE OF CORRECTION

Patent No. 3,645,942    Dated February 29, 1972

Inventor(s) Lloyd H. Brown and Laurence J. Klemm

It is certified that error appears in the above-identified patent and that said Letters Patent are hereby corrected as shown below:

Column 5, line 25 "sugar" should read --sugars--., Column 7, line 33 "trimethylamine" should read --triethylamine--.

Signed and sealed this 6th day of June 1972.

(SEAL)
Attest:

EDWARD M. FLETCHER, JR.
Attesting Officer

ROBERT GOTTSCHALK
Commissioner of Patents